March 14, 1967 W. J. PARKS 3,308,952
VIBRATING SCREENING APPARATUS WITH WEDGE RING SUPPORT
Original Filed April 3, 1961 7 Sheets-Sheet 1

FIG. 1

INVENTOR.
WALTER J. PARKS
BY
*Fay & Fay*
ATTORNEYS

March 14, 1967 W. J. PARKS 3,308,952
VIBRATING SCREENING APPARATUS WITH WEDGE RING SUPPORT
Original Filed April 3, 1961 7 Sheets-Sheet 5

INVENTOR.
WALTER J. PARKS
BY
Fay & Fay
ATTORNEYS

March 14, 1967   W. J. PARKS   3,308,952
VIBRATING SCREENING APPARATUS WITH WEDGE RING SUPPORT
Original Filed April 3, 1961   7 Sheets-Sheet 6

INVENTOR.
WALTER J. PARKS
BY

*Fay & Fay*
ATTORNEYS

FIG. 17

L = SPAN OR WIDTH OF SCREEN BODY
W = TOTAL LOAD ON CROSS MEMBERS

MAXIMUM MOMENT AT CENTER OF SPAN = $\frac{WL}{8}$

FIG. 18

MAXIMUM MOMENT AT CENTER SUPPORT = $\frac{W}{2} \times \frac{L}{4} = \frac{WL}{8}$

FIG. 19

FOR THE OUTSIDE CANTILEVER SECTION
MAXIMUM MOMENT AT CENTER SUPPORT = $\frac{W}{3} \times \frac{L}{6} = \frac{WL}{18}$ FOR THE CENTER BEAM SECTION
MAXIMUM MOMENT AT END SUPPORTS = $\frac{\frac{W}{3} \times \frac{L}{3}}{12} = \frac{WL}{108}$ INVENTOR.
WALTER J. PARKS
BY
*Fay & Fay*
ATTORNEYS United States Patent Office 3,308,952
Patented Mar. 14, 1967

3,308,952
VIBRATING SCREENING APPARATUS WITH WEDGE RING SUPPORT
Walter J. Parks, deceased, late of Cleveland, Ohio, by Robert L. Baker, executor, Auburn Township, Geauga County, Ohio, assignor to W. S. Tyler, Incorporated, a corporation of Ohio
Continuation of application Ser. No. 100,287, Apr. 3, 1961. This application Aug. 30, 1965, Ser. No. 486,593
5 Claims. (Cl. 209—329)

This application is a continuation of the U.S. patent application of Walter J. Parks which was filed in the Patent Office on April 3, 1961, and assigned Ser. No. 100,287, now abandoned.

This invention relates to a novel concept of screening apparatus particularly directed to the structural design supplied to a vibrating screen body which will give an improved performance with less weight of metal in the screening apparatus and which incorporates design features characterized by a central longitudinal member having one or more of the vibration producing elements either above or within the central longitudinal member and further incorporating cross members, generally in tubular form, secured through the central longitudinal member.

In general, this application is directed to a concept of structural design which departs from prior designs of single or multiple deck screen body construction by replacing the externally located and longitudinally extending body frame members with one or more centrally located members so that the cross members of the body are no longer supported at their extreme ends but are more advantageously supported intermediate of their ends to create a more efficient structure from both a design and operational viewpoint.

Basically, this invention is then directed to this new concept of a structural design of vibrating screen bodies which for a given area of screening surface will result in a body of less weight but of increased resistance to fatigue failures. This concept has further important considerations in that the basic structural arrangement of compact vibrational producing elements in a wide variety of arrangements and types. The main element of this structure is a longitudinal extending member or members, there may be more than one, running parallel to the flow of material passing over the screen deck. To most effectively perform its function, this member is preferably formed as a hollow tubular member, generally of rectangular cross-section.

It is understood, however, that in certain modifications of this invention and to a more limited extent, it could be in other forms such as a reinforced rectangular plate-like member with or without flanged reinforcing elements. The tubular shape of this longitudinal member creates in itself an integrally braced strong rigid element capable of safely carrying the bending stresses in both a horizontal and vertical direction and maintaining an overall resistance to distortion or relative flexing of the structural components of the body. In effect, this member forms a backbone for the screen body being formed to contain within itself all the necessary strength and stiffness to support and restrain all other body structural members, actuating means and supporting means to the adjacent stationary structure.

Presently used equipment generally calls for thin plates, flanged or otherwise, spaced from each other by the width of the screen deck. In this type of construction, the plates are relatively strong and stiff in a vertical direction, but very weak and flexible in the horizontal plane lengthwise the machine. In order to resist buckling, sidewise flexure and relative torsional displacement of the side plates, it is necessary to depend on the bracing effect of the structural members running between these side plate members. The high incidence of cracking of the plates in a design of this type, particularly in screen bodies of considerable length such as upward of 10 ft. long, is good evidence that this type of bracing is not always efficient or adequate.

This invention is then directed to a construction incorporating centrally located tubular member or members which must, in general, be capable of carrying loads that would produce stresses equal in magnitude to those of the two externally arranged side plates of the conventional design for equivalent weight of body and acceleration constant of operation which depends principally on amplitude of motion and the speed of operation. However, some savings in weight can be accomplished in this new design because of the overall reduction of weight of the screen body for a given area of screen surface, the permissible use of higher stresses in the beam member because of greater increase of lateral stiffness and the elimination of a great deal of local and reverse bending due to the attachment of the cross members, including bracing members, to the external side plate members.

In general, it should be stated that the screening equipment is in the same category as vibration equipment which is used for accelerated fatigue tests and must be designed accordingly. This, together with the problems of localized bending moments, lack of lateral stiffness of component parts and stress risers such as notch effects in structural parts, have made necessary a very low limit of design stresses in the parts to avoid premature failure. For example, bending stress in presently and conventionally designed screen bodies have been limited to the very low level of approximately 2,500 lbs./sq. in. for carbon steels having an ultimate strength of 60,000 lbs./sq. in. with a yield point of 30,000 lbs./sq. in. The new design herein described will permit these allowable stresses to be materially increased, probably in the order of 50%. This will permit the use of structural parts of considerably less weight for equally reliable results. The weight reduction is very important inasmuch as these machines have to operate at amplitudes of motion and speed of operation which create acceleration forces of from 4 to 8 times gravity. This means that every pound of material in the vibrating body has an effective increase in weight of the same amount in calculating the loads and stresses of component parts.

An object of this invention is to coordinate the arrangement and design of the component parts, including the vibrating screen body, of a screening apparatus so that an assembly is produced whereby for a given area of effective screening surface the weight of at least some of the component parts can be drastically reduced below that of the presently built vibrating screen bodies by more favorable stress conditions in the members under operating conditions and it does so by incorporating the longitudinal load carrying members into one or more central longitudinal tubular component or components and incorporating cross members of tubular design passing through said central longitudinal tubular member.

A further object of this invention is to provide a structure for a vibrating screen body wherein at least one centrally located load carrying member running parallel to the direction of flow of the material on the screen surface is provided for attachment and support of one or more screen actuating units as well as all other structural components constituting the screen body and to do so with a design so that the permissible stresses in these members can be increased from those currently used while at the same time maintaining or increasing the fatigue life of the component parts of the design.

A further object of this invention is to so form and fabricate the main longitudinally extending support members of a vibrating screen body so that the actuating unit or units may be incorporated within said members to form a compact assembly providing ease of installation, improved efficiency of operation and streamline design.

The accomplishment of the foregoing objective is particularly desirable in those designs in which the actuating unit incorporates a revolving shaft, or equivalent, with eccentric weight members wherein the mounting internally of the longitudinal member permits the center of revolution of the revolving mass system to be at or approximately at the center of the mass of the vibrating screen body so as to maintain uniform circular motion of the body when the screening problem is best handled by this uniform motion.

A further object of this invention is to incorporate in vibrating equipment of this type suitable cross support members, preferably tubular, efficiently arranged and designed whereby a multiplicity of decks can be secured thereto for efficient support of said multi-deck operation.

A further object of this invention is to design the structural components of screening apparatus in such a way that they may be flexibly arranged to form screen bodies of different dimensional construction and in particular whereby said central longitudinal members are capable of supporting thereon or therein various types of vibration producing units interchangeably whereby the vibrational characteristics as to path of motion can be altered as required by the screening problem.

Having in mind the foregoing objects and the general approach to this invention, it should be made clear that this invention starts from the point of mechanically actuated screening equipment of rigid body construction which, in general, up till now has involved the extending of all body cross members and actuating unit support members across the full width of the machine before terminating in the longitudinal load carrying members. This invention starts with the idea of a central actuating element or elements, either on top or within a central longitudinal load carrying member. It should be realized full well that for maximum screen width sometimes two central longitudinal members would be employed and this is done with a very distinct purpose in mind. It should also be kept clearly in mind that in general there have been certain types of central actuating members, most of which involve contacting the screen surface in some manner including most of the magnetic vibrators which only actuate a portion of the surface with the maximum amplitude and with lesser amplitudes over the remaining portions of the surface. This is, in general, a centrally actuated screening unit that operates with the same motion across the full width of the screening equipment and subjects every particle and every piece of aggregate on the deck to the same mechanical action. The development of these screen units for normal screening problems with the low limit of permissible stress (2500 lbs./sq. in.) and the acceleration factor of 4 to 8 g's on all parts has resulted in very heavy structures particularly in the wider widths of machines. This makes a heavy, cumbersome and expensive construction.

For a clear understanding of this invention, attention should also be directed to the components of the invention, such as the longitudinally extending load carrying member which is centrally and symmetrically located on the cross members. This makes possible one of the important features of the invention which involves breaking up the span of the cross members into two or more sections. This together with the improved connections at all positions on the cross members makes possible substantial reduction in size and savings in weight of these cross members without sacrificing the strength or overall reliability under operating conditions. These cross members would be preferably of round or tubular construction. Other types and shapes of cross members could be used under certain conditions. The round shape is preferred because it best suits the wedge type joint construction which is a preferred type of joint between the principal body structural members and the tubular sections. This is preferred over a solid shaft type member because of its lower weight for a given strength and stiffness of member.

The transverse cross member of round cross section is preferably continuous or in a single length across the entire width of the machine from side plate to side plate and arranged in more or less uniform spaced relationship along the length of the longitudinal member. All joints between the cross members and the other structural members to which it is attached are preferably of a wedge type. This joint is characterized by a split wedge member which is fitted loosely over the cross member in the desired location and then for final assembly is drawn down tightly on the cross member by mating wedge surface of the surrounding cap member with its tightening bolts. This provides a very secure locking of one member to another without in any way interrupting the continuous and uniform structure of the cross beam.

This is an important consideration as these members are subject during operation to loads which vary in either or both magnitude and direction producing a loading condition that is constantly deflecting this member one way or the other. The cross member must be so designed that this deflection is kept very small. On an average width of a conventional design machine, this could be of the order of 0.010 to 0.015 in.

In a varying degree this deflection is always present and its action can be compared to that of a bar type spring. This being the case, the same precaution must be taken in the design of these cross members as would be taken for a typical spring design. This basically would require minimizing any notch effect that would be a stress riser such as holes or notches in the parts or sharp shoulders of any kind. It is also desirable to eliminate welding of any kind in the stressed areas of such a spring member. This can be troublesome because of a deterioration of the material at or near the weld or notch effects caused by undercutting of the weld. The wedge type mounting eliminates these causes of premature failure. Additionally, the action of the wedge members is to introduce a compression stress component in the outside fiber of the material comprising the cross member. This compression factor particularly at the most highly stressed portions of the beam very effectively increases the fatigue resistance at these points.

Both of the foregoing factors enable the use of higher stresses in these members with a consequent reduction in weight without sacrificing the durability of the parts. Another way of looking at this would be that in present designs the maximum stress is established to make ample allowance for the presence of such stress risers occurring in more or less random fashion and the elimination of such weaknesses enables the use of higher permissible stress for a given section.

To the accomplishment of the foregoing and related ends, said invention, then, consists of the means hereinafter fully described and particularly pointed out in the claims; the following description setting forth in detail one approved means of carrying out the invention, such as disclosed means, however, constituting but one of the various ways in which the principles of the invention may be used.

Figure 1:
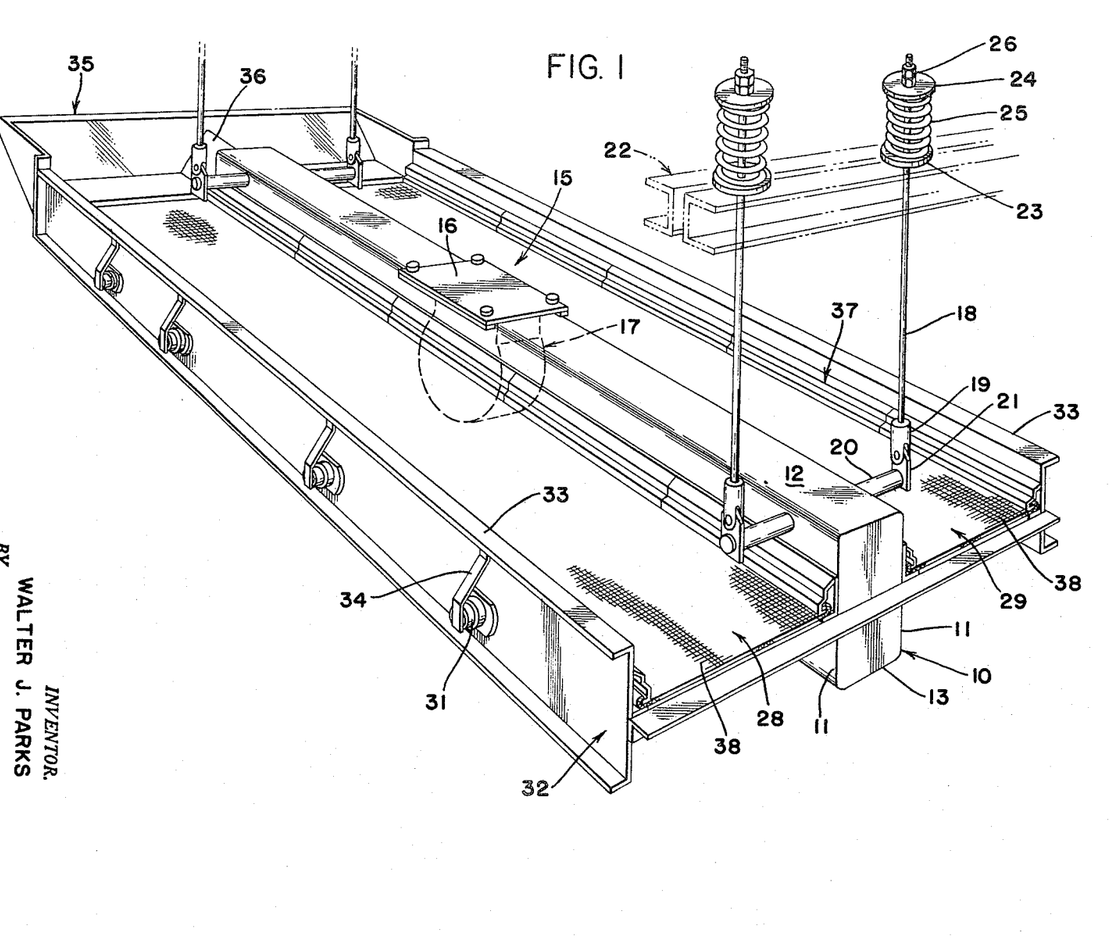
FIG. 1 is a schematic perspective view of the novel assembled unit including a central longitudinal beam member with an integral motor vibrator in said beam member.

In FIG. 1 there is illustrated a general central longitudinal tubular member 10 having sides 11, top and bottom 12 and 13, respectively, of generally rectangular structure extending the full length of the machine. Associate components of this apparatus include an electrical motor vibrator 15. This is secured as by means of a mounting plate 16 which is bolted to the upper portion of the central longitudinal member 12 and this motor vibrator is shown on dotted lines as at 17 and would be capable of actuating the entire combination. Since in general the equipment is rigid, the entire screen body would vibrate through a controlled path of action depending upon the characteristics of this motor vibrator.

The general supports for the screening apparatus consist of a number of vertical members, one of which is indicated at 18 mounted as by means of a clevis arrangement 19 to a cross support member 20 which would be secured or mounted to the central longitudinal member 10. These vertical support members would be secured to an upper support beam shown schematically as at 22 incorporating some type of upper mounting plate 23 which would be located on the beam structure and a further plate 24. The support 18 would pass through said plates and through a spring 25 and the upper plate 24 and be secured as by means of nuts or other means as at 26. This means that the entire screening apparatus would be resiliently supported through the upper mounting plate 24 and the spring 25 to the plate 23 and the beam structure 22.

The other features of the apparatus can best be explained in connection with the additional diagrams, but, in general, the apparatus would incorporate two longitudinally extending screen decks, one of which is indicated at 28 and another at 29. They would generally be of equivalent width and length. The cross support members for said screen decks and for the side mounting plates can best be described in the other figures, but attached to the ends of the cross support members, said ends being indicated at 31, would be secured the side mounting plates 32 which might be flanged channel members; the upper flange is indicated at 33 and these will not be principal load carrying members. They would simply be retaining strutural members to support the tension in the wire screen deck and to pervent spillage of the aggregate off the screen deck itself. They would not be carrying the load of the screen surface which would be transmitted through the cross members to the central longitudinal member. The additional features of the invention, of course, would include some type of apparatus for directing the aggregate onto the screen deck as is indicated at 35 which would incorporate a series of plates and this would also incorporate perhaps some type of diverting structure as at 36.

Figure 2:
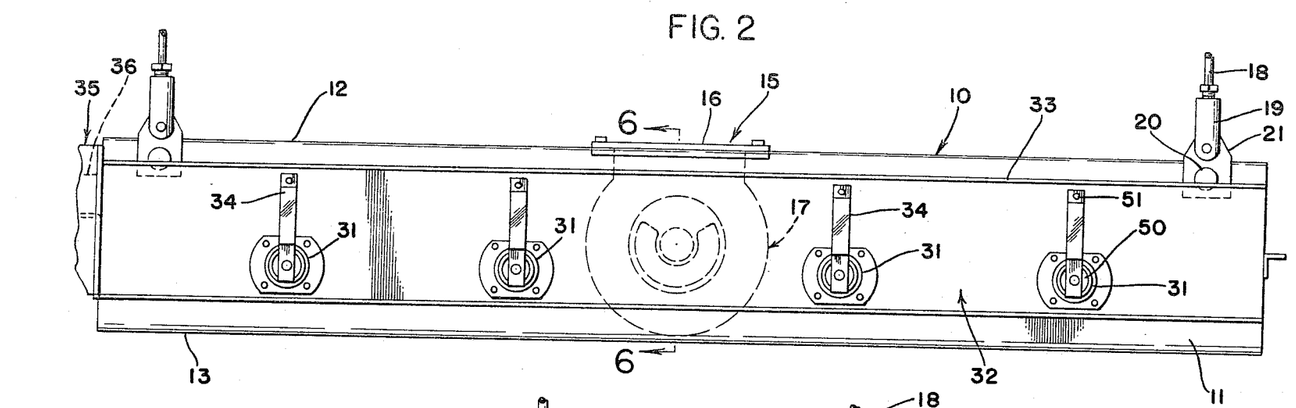
FIG. 2 is a fragmentary enlarged side elevation view of said apparatus.

FIG. 2 is a side elevational view of this same apparatus. In this view the cable supports 18 and the clevis 19 are shown together with a mounting bracket 21 secured to the cross bar 20. In this view the central location of the integral motor vibrator within the central longitudinal members is clearly indicated at 17 and the geometrically positioned cross members are shown symmetrically spaced with respect to the motor vibrator. The ends of these cross members are indicated at 31. Simple reinforcing support members are indicated at 34 from the end of the cross member 31 to the channel side member 32. From this central position, the integral motor vibrator will vibrate, in an aproximately circular path, the entire screening apparatus, under those conditions where a circular motion for the particles is desired. It is realized that reciprocatory, elliptical or certain other motions may be employed at certain times. This apparatus is particularly useful in that a very simple and compact motor vibrator can be centrally positioned with respect to a backbone member or central longitudinal member and can vibrate the entire screening apparatus in a specified direction as desired.

Figure 3:
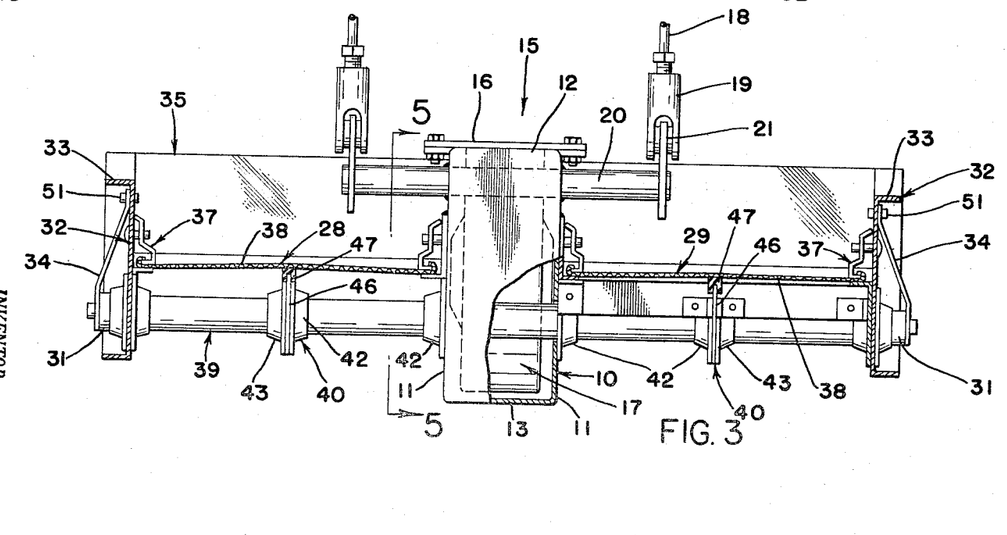
FIG. 3 is a further enlarged right end elevation of FIG. 2 with the parts broken away.

The general location and arrangement of components is seen clearly in connection with FIG. 3 where the two screen decks 28 and 29 are attached as by means of a simple clamp and hook strip indicated generally at 37 so as to tension the screen cloth itself, indicated at 38. The wedge ring structure connecting the cross members to the central longitudinal member and to mounting plates for the screen deck one of which is shown at 40, will be illustrated in connection with the additional figures. But, in general, it can be readily seen how a single member 39 will pass entirely through the central longitudinal member and will be efficiently supported and connected to all longitudinally extending members by these wedge connections. This arrangement as shown in this modification, will be for four cross members, realizing however, that there could be a greater or lesser number of cross members.

Figure 4:
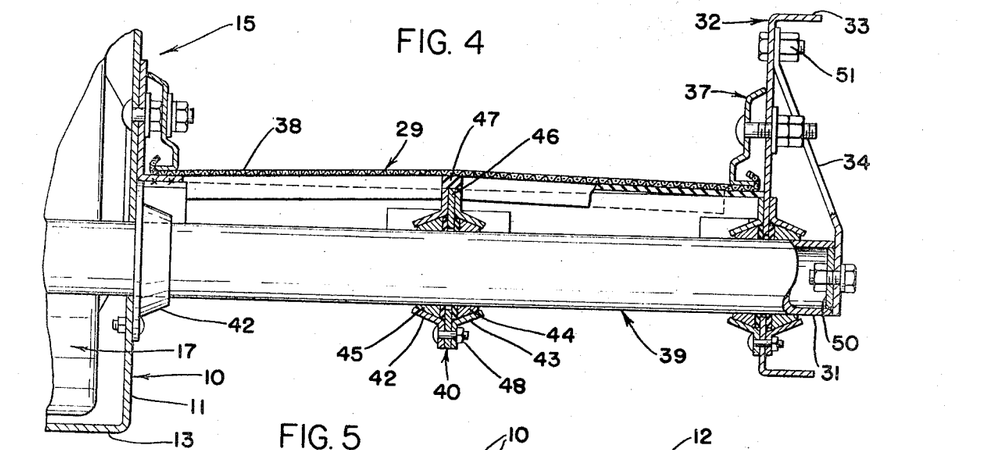
FIG. 4 is a further enlarged fragmentary view of FIG. 3 with the parts broken away.

FIG. 4 shows particularly this combination of the cross support member 29 and a typical wedge ring structure as seen in connection with these figures. Here, for example, will be one wedge cap member generally indicated at 42 and opposed wedge cap member 43 and a generally truncated conical wedge ring member of rigid material as at 44, and a mating member as at 45 of similar composition. The outer side plate member 32 is similarly mounted on the tubular member 39 and at the center longitudinal member 10 a similar construction is used except only a single wedge member 44 and cap member 42 is used on each external surface of side 11 of beam 10. There may be assorted structures such as bridge rails or other means connecting to these tubular members by similar means. In this case, one is indicated at 46 acting as an intermediate support for the screen deck 29. This support member may be capped by a resilient member extending along the deck as seen at 47. In this instance, fastening means or bolt means shown at 48 will draw up the members 42 or 43, 44 or 45, tightly together making a secure joint between members 46 and 39. The wedge members 44 and 45 will compress the tubular member 39 without actually providing any stress risers or weakened welded sections in said member. The tubular member itself would be provided with an end plate shown at 50 and this would have mounted to it the support member 34 providing support to the channel member 32. This will be fastened as at 51 to said channel member.

Figures 5, 6, 7:
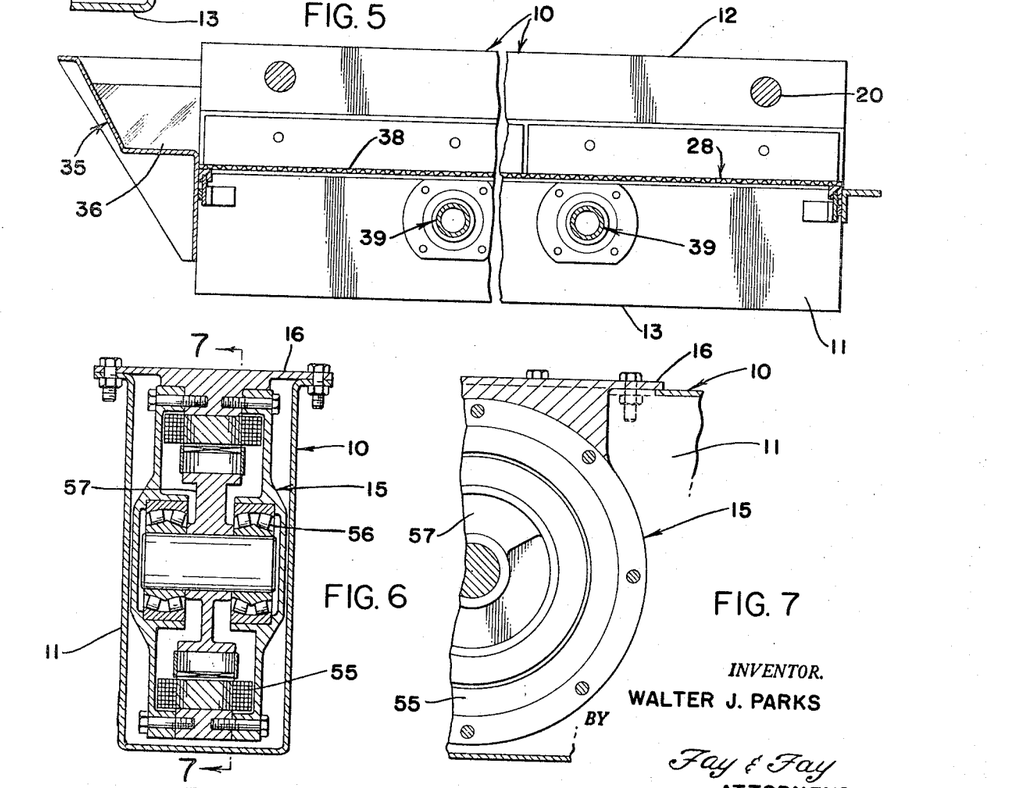
FIG. 5 is a fragmentary view taken along the line 5—5 of FIG. 3 showing a side elevation of a view of the central longitudinal member.
FIG. 6 is an enlarged section taken along line 6—6 of FIG. 2 showing the integral motor vibrator.
FIG. 7 is a fragmentary view taken along the line 7—7 of FIG. 6 showing the eccentric weight combination.

FIG. 5 shows a further side elevational view of said central longitudinal member showing the feed plate 35, the diverter 36 together with the cylindrical supports 20 and showing at least two of the cross beams 39 therein.

FIG. 6 shows a view of the integral motor vibrator mounted in said central longitudinal beam 10. This would have an upper mounting plate or flange indicated at 16. The vibrator itself being designated 15 and this would incorporate electrical drive means generally indicated at 55 and having certain types of bearing support means as indicated at 56 and a central weight shown at 57 which is eccentric to the shaft to produce a vibratory motion of the screen body. This is a compact arrangement in which the motor elements and vibration producing elements including the eccentric weights are arranged substantially radial with one another and provide a simplified construction that is readily adapted to fit within the central longitudinal member. It is, of course, understood that there could be a single vibrator or a multiplicity of vibrators.

Figure 8:
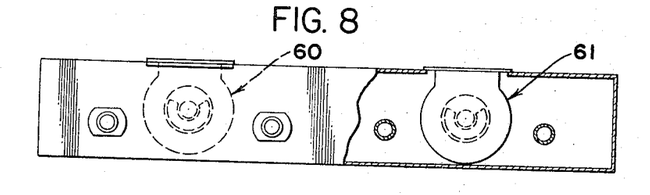
FIGS. 8 and 9 are schematic side elevation views showing multiple vibrator installations.

A further modification of this invention is shown in connection with FIG. 8 where two vibrators of the eccentrically weighted type, one indicated at 60 and the other at 61, are shown attached and integrally mounted within the central longitudinal members. This multiple vibrator arrangement has a distinct advantage in that for a given weight of screen body operating at a given speed and amplitude of motion, the vibrators can be smaller than if only one is used. Also for machines, particularly in larger sizes, operating at high speeds of the order of 1800 r.p.m. and upwards, the use of these multiple vibrators enables a smaller diameter size bearing to be used for a given total vibrational specification. This is important because the maximum recommended speeds of bearings is reduced as the diametral size increases. Additional advantages of flexibility of vibrational path of motion are also obtained by this multiple arrangement and this will be later described.

Figure 9:
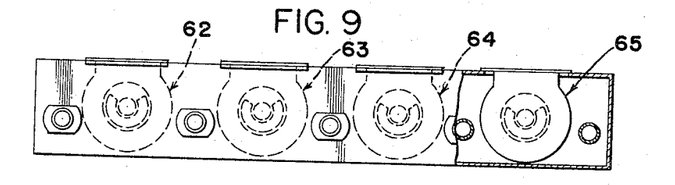

FIG. 9 shows further apparatus with four vibrators indicated generally left to right at 62, 63, 64 and 65. Here again, they could be operated in various manners as will be later described to produce a desired vibratory pattern to suit the material being screened.

Figure 10:
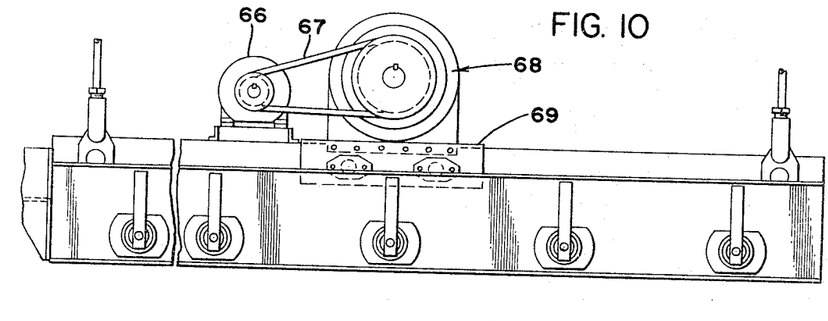
FIG. 10 is a fragmentary side elevation view similar to FIG. 2 showing a modification of the vibrator unit.

FIG. 10 shows a further modification in which a vibrator of the rotating eccentric weight type and indicated at 62 is mounted on top of the longitudinal member and driven by means of an electrical motor indicated at 66 which is similarly mounted on the same member, through a sheave and V-belt drive indicated at 67. This vibrator 68, although it would be differently arranged internally, would have similar vibrational producing components as that of item 17 of FIG. 1 and perform the same function.

Figure 11:
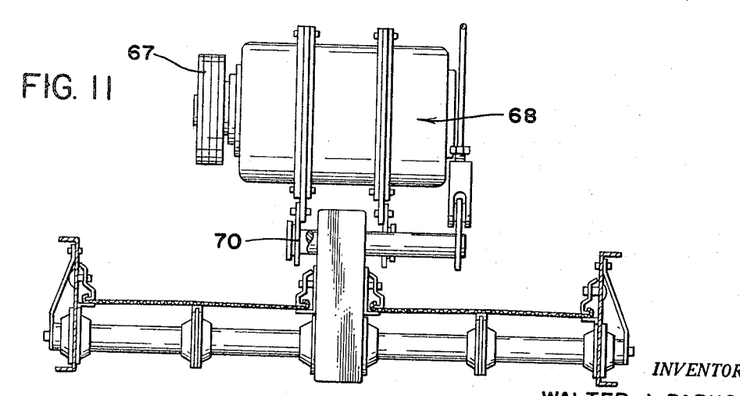
FIG. 11 is an enlarged right end elevation of FIG. 10 with the parts broken away.

FIG. 11 is a further view of said apparatus showing the belt drive at 67, the vibrator itself at 68 and mounting means to the central longitudinal member as at 70.

Figure 12:
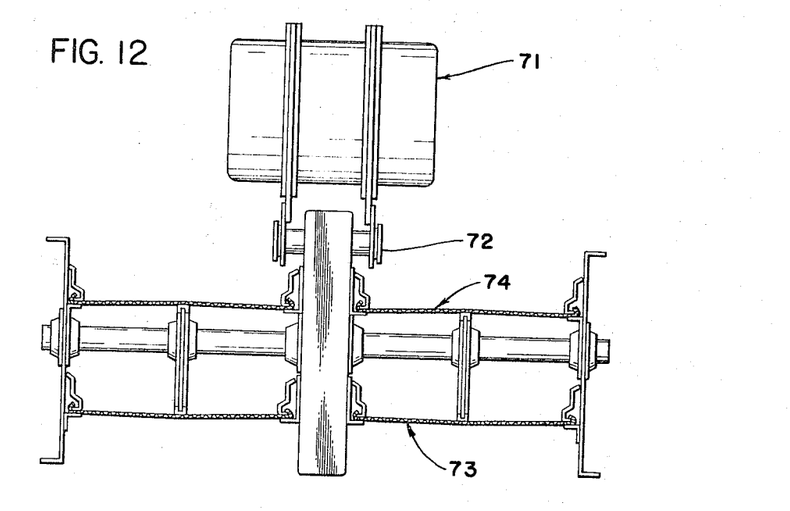
FIG. 12 is a view similar to FIG. 11 showing a modification of the screen incorporating a multiple deck structure.

FIG. 12 is a further modification showing a vibrator structure 71, mounting means at 72 to the central longitudinal member and showing a central longitudinal member with means for securing two decks, a second lower deck being shown at 73, with the upper deck at 74. This figure shows generally the versatility of this construction whereby a screen section can be added to form a second surface in the machine using the same structural components that are used to support the first surface, with the exception of lengthening the side plate and bridge rail member. This results in a considerable reduction in weight of the screen body by avoiding the use of a second set of cross members.

Figure 13:
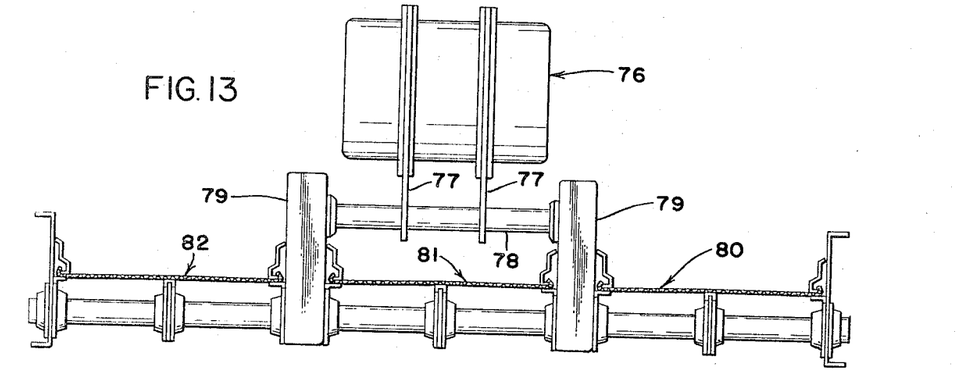
FIG. 13 is a similar view modification showing a 3-section screen deck having two longitudinal extending support members.

FIG. 13 shows a further modification in which a central vibrator is shown at 76 attached to support plate 77 on cross support 78 which is fixed, in turn, to a pair of central longitudinal members either one of which is indicated at 79. In this instance, there are two longitudinal members breaking up the screening surface into three screening surfaces, the right hand one being indicated at 80, the center one at 81, and the left hand one at 82. The tubular cross support members are the same as well as the other associated components.

Figure 14:
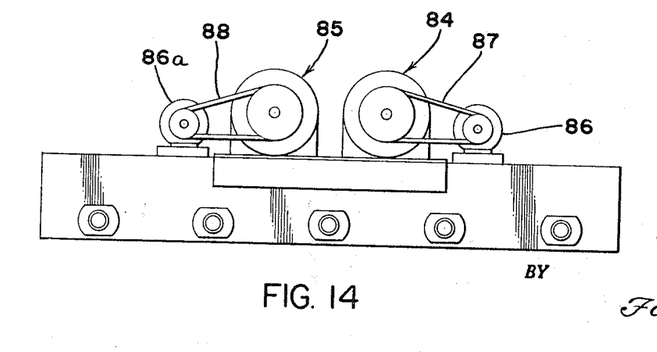
FIG. 14 is a schematic side elevation similar to FIG. 8 showing multiple overhead vibrators.

FIG. 14 is a view similar to FIG. 8 showing how two vibrator elements, one of which is indicated at 84 and the other at 85, can be used in connection with a modified form of this apparatus, there being a plurality of electric drive motors, one of which is indicated at 86 and the other at 86a mounted on the same longitudinal beam. The associated sheave and belt drive connections therebetween are shown at 87 and 88. Alternately, if desired, the electric drive motors 86 and 86a could be mounted separately from the screen body on adjacent stationary structure.

Figure 15:
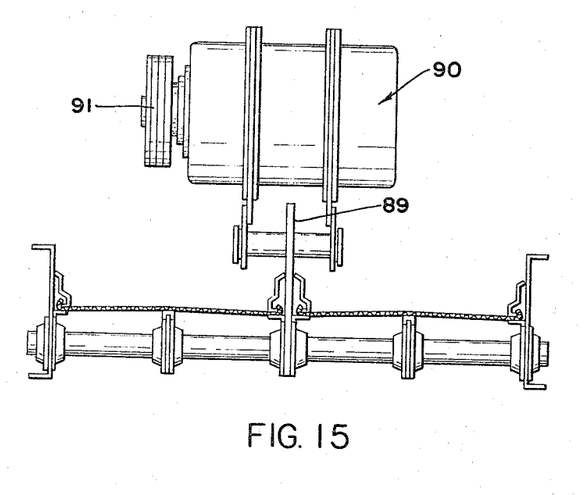
FIG. 15 is a further modification.

FIG. 15 shows a further modification of this invention in which plate elements are employed in connection with the invention, 89 indicating a plate member attached to a motor vibrating structure. This vibrator is indicated at 90, the connecting drive means therefor is indicated at 91 and the plate members themselves, indicated at 89, are attached to the usual associated cross supports tubular members, wedge rings and the like of the earlier modification.

Figure 16:
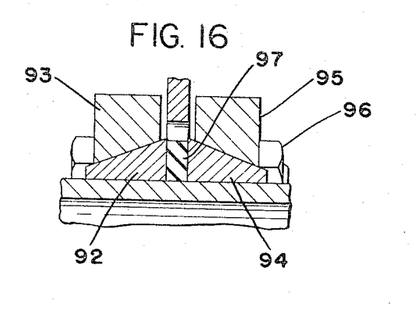
FIG. 16 is a cross sectional view of a wedge ring used in this invention.

FIG. 16 is a cross sectional view of a wedge ring structure in which one truncated conical wedge member 92 is secured within the general shape of wedge clamp 93. The opposite members are respectively 94 for the ring and 95 for the clamp. These are bolted together as for example at 96. Between the two members are elastomer rings backing up each of the wedge rings. One of these is shown at 97. Each wedge ring is a split ring to permit a reduction in diameter and to put compression on the tube. The wedge rings are made of rigid material and the back up portion is of elastomer. This particular feature will reduce stress concentration on the tubular cross member.

Figure 17:
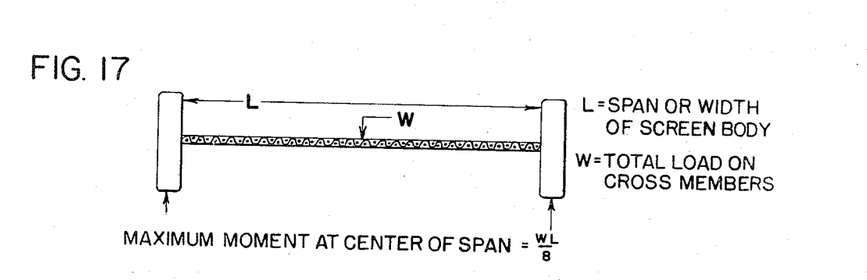
FIGS. 17, 18 and 19 are diagrammatic illustrations of the forces involved in certain of these screen modifications.
Figure 18:
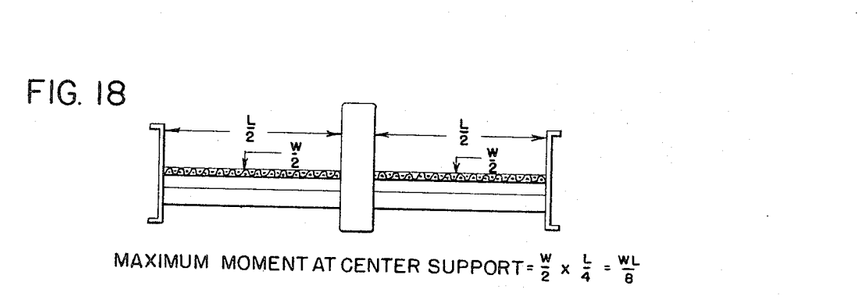
Figure 19:
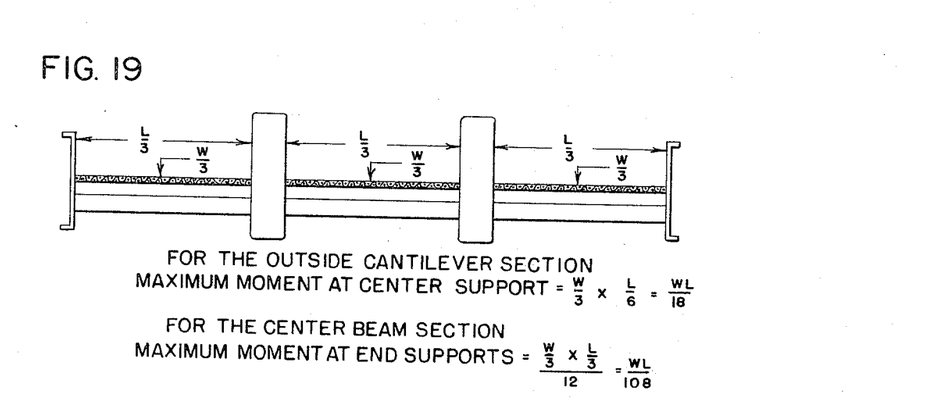

FIGS. 17, 18 and 19 indicate a load diagram of the cross members of the screen body making certain assumptions for clarity, and then calculating the maximum moment on these members for the different types of support to show the relative merits of this invention as alternately arranged as compared to previous constructions.

FIG. 17 is a loading diagram of a cross member for a conventionally designed vibrating screen body. This is equivalent to a beam supported at both ends and having uniform loading. L will be equal to the span or the width of the screen body and W is the total uniformly distributed load on the cross members. The maximum moment on the center of the span would then be $$WL/8$$

FIG. 18 is a loading diagram of a continuous cross member for a vibrating screen body wherein it is supported by one centrally located longitudinal beam. To be comparable to the earlier diagram, it has been assumed that total effective width of the screen area and the unit load will be the same as for the former and so that the free span and the load carried by each span would be $L/2$ and $W/2$, respectively. The load diagram for each of the two spans would be equivalent to that of a cantilever beam having a fixed end at the point of support on the central longitudinal beam and being uniformly loaded. For the purpose of this diagram, it will be assumed that the weight of the external side plates are incorporated in an equivalent manner into the uniform loading on the beam. Consequently, it can then be calculated that the maximum moment at the center of the support would be $$W/2 \times L/4 = WL/8$$

FIG. 19 is a further load diagram of a continuous cross member for a vibrating screen body wherein the cross member is supported by two centrally located longitudinal beams. To be comparable to earlier diagrams of FIGS. 17 and 18, it has been assumed that total width of the screen area and the unit load will be the same as for the former so that the free span and load carried by each span will be $L/3$ and $W/3$ respectively. The load diagram for the outside two spans will be approximately the same as for the FIG. 18 and that for the center span will be approximately equivalent to that of a beam fixed at each end. As in FIG. 18, it is assumed that the weight of the external side plates are incorporated in an equivalent manner into the uniform loading on the beam. For the outside cantilever section the maximum moment at the center support will be $$W/3 \times L/6 = WL/18$$

For the center beam section, the maximum moment at the end supports will be $$\frac{W/3 \times L/3}{12} = WL/108$$

From a study of these three diagrams in FIGS. 17, 18 and 19, it will be seen that by comparing the maximum bending moments of FIGS. 17 and 18 that they are of the same magnitude. In this case, the only saving in weight by this structure, then, would be made because of permissible uses of higher stresses for the reasons heretofore given. In connection with FIG. 19, it can be shown that for given conditions an approximate decrease of 56% of the maximum moment as indicated by the formular for the outside cantilever section, which would be $WL/18$, could be achieved. This will substantially reduce the size of the cross members for a given total overall width of the screen body. This factor could be substantially improved if the centrally located supports were so spaced as to make equal the maximum moment at the point of support of the cantilever section and the center beam section. This would require screen sections of different width for the cantilever section and the center section, and the desirability of this, from an operational standpoint, would be questioned. All sections of the screen cloth should be interchangeable and for this reason FIG. 19 indicates this condition.

Current screen specifications are calling for increasingly wider machines, on the order of 8–10 ft. and upwards, and sometimes as much as 20 ft. in length. It is particularly in these wider machines that multiple arrangements of centrally located longitudinal beams would be most effective in reducing the overall weight of the machine, particularly where the machines are to be used for screening small to medium sized materials and aggregate. Screens of the above width and conventional design become tremendously heavy and expensive. For ordinary screening problems and using conventional design, a rule of thumb specification for the overall size of the cross members would be 1 in./ft. of width. Thus, for an 8 or 10 ft. wide machine, the cross members would be 8 in. or 10 in. deep, respectively. It can be seen that this makes a sizeable machine from the very start. It is in an effort to reduce the size of these components that this invention has been devised.

The structural arrangement of the components of the vibrating screen body as heretofore described has the additional advantage in that the central longitudinal member or members are ideally located to facilitate the attachment of the actuating vibrating units in single or multiple arrangement. It is becoming increasingly desirable to build the actuaing vibrating units into as small and compact units as is consistent with the magnitude of the vibrational job it has to do. This generally means that the unit will be shorter by a considerable amount than the distance between the side plates of a conventionally built machine where these members are the main longitudinal load carrying members that are mounted at the extreme ends of the cross member elements. To apply one or more of the compact actuating units of lengths less than the distance between these external side plates requires the provision of another structural element in the form of a beam to transfer the loads from the side plates to the actuating elements. This beam would be heavily loaded and requires a massive member in proportion to the size of the vibrating body. Inasmuch as these compact actuating units are practically always centrally located with respect to the screening surface width, the provision of a centrally located main longitudinal member or members provides for a direct and rigid connection without the use of large secondary members or the extension of the unit itself to span the necessary distance.

A particularly direct connection and desirable location of the actuating unit is shown in the drawings of the specification wherein the actuating unit is mounted internally of the tubular unit of the longitudinal beam. This can be seen in connection with FIGS. 1, 2 and 3. It is well known in the screening art that if it is desired to produce a uniform circular motion of the gyratory type on a rigid body such as a screen body by the use of a revolving shaft with eccentrically mounted weights thereon, it is necessary that the center of revolution of the shaft be at or close to the center of mass of the body. The internal mounting of the actuating unit makes possible such an approximation of the centers with resulting uniform circular motion. A type of unit that will be applicable for this service is illustrated in connection with FIG. 6 of the drawings.

The basic elements of this unit are a shaft mounted for rotation in bearing members and having mounted on its central portion a disc or wheel-like member with an eccentrically displaced mass section on the faces of the wheel or disc while on the rim is mounted a squirrel cage rotor construction. Surrounding the outer diameter of the above and supported by the main frame of the unit are the pole pieces and coil windings to complete an electric motor assembly to drive the rotor. The bearings in which the shaft is mounted are also mounted in the main frame of the unit. The main frame is of a type which would totally enclose the mechanism.

The internal location of the actuating unit will also be advantageous from a structural and compact design standpoint for the installation of an electrical magnet or other types of vibrators producing a more or less reciprocating action of the vibrating body. The centrally located longitudinal member is ideally located to accept the attachment of one or more actuating units. Illustrations of this occur in the drawings where 1, 2 and 4 of the above described internal vibrators are shown.

It is clear from the foregoing description that while internally mounted vibrating units of the revolving shaft type have been illustrated in some of the drawings, it is fully understood that externally mounted units of similar revolving shaft type could be used as an alternate arrangement. In either case, the unit or units could be powered with air, hydraulic or electrically driven motors either integrally constructed with the vibration producing means or independently mounted with connecting driving means.

This alternate construction, as was shown in the foregoing drawings, is that of an actuating mechanism arrangement of FIGS. 10 and 14. This design is adapted to be mounted preferably just above the centrally located longitudinal beam member either singly as in FIG. 10 or in multiple units as in FIG. 14. Using a single unit in the location shown, the vibrating body will have a non-uniform or more or less elliptical motion because of the relative displacement of the center of rotation of the rotating mass and the center of mass of the body. An arrangement of a multiple unit is shown in FIG. 14. The same flexibility of operation, insofar as paths of motion are concerned, can be obtained from the actuating unit as from the unit previously described by the same method, making due allowances in the resulting path of motion for the relatively larger displacement of center or rotation of the revolving masses from the center of mass of the vibrating body.

It will also be appreciated that in connection with the multiple arrangements of vibration producing elements as illustrated in FIGS. 8, 9 and 14, the path of motion of the screen body can be varied over a wide range from the translational motion of a uniform circular or reciprocating path to differential translation motion wherein the body paths of motion can be of non-uniform amplitude, form and of varying phase relationships. This flexibility of operation can be obtained by varying either separately or in combination the relative masses of the rotating eccentric weights, the relative speeds of the rotating shafts, the relative direction of rotation of the rotating shafts and the relative location of the actuating units on the supporting beam.

In general the results of such variations as listed are well known in the screening field and it is only necessary to point out that where multiple vibrators of the rotating shaft type are used, the relative directions of rotation of the shafts can be obtained as desired by use of electronic or mechanical means such as gears, timing belts or chain drives arranged to accomplish the desired results. As a special case wherein the shafts of one or more pairs of these multiple vibration producing units are to be driven at the same speed but in opposite directions for producing a straight line reciprocating motion, the synchronizing effect of the vibrational motion will in itself accomplish the phase relation timing of the various units to produce this motion without any direct interconnecting means. This would be illustrated by the arrangement of FIG. 14. Using the same figure for reference if the shafts are to operate in the same direction and in phase to produce a circular or elliptical path on the screen body, the separate units would have to be synchronized by electronic or mechanical means interconnecting the two.

The results accomplished by these means indicate the wide range of possibilities to which the structure herein disclosed lends itself with a resultant versatility which is becoming increasingly important in this field. It will also be appreciated that by this construction a vibrating screen body is produced which will accept interchangeably a variety of such actuating units so that such motions can be originally built into the machine and can be rearranged later to vary the motion according to the needs of the screening operation being handled at that time.

In all of the foregoing designs, it is required that the vibrating body be resiliently mounted from the supporting structure by spring type means as illustrated in FIG. 1. These spring means are preferably mounted directly off the center tubular element as shown. This is preferred to a mounting, for example, at points along the external side plates as this would necessitate increasing considerably the size of the cross members adjacent to such points of attachment to carry the additional load. The external side plates of this new device are considerably different from the conventional vibrating screening equipment. These members are no longer the main longitudinal load carrying members of the machine, but are themselves supported at reasonably close intervals by the cross members of the machine. Their only functions now are to retain the material on the screen deck, to accommodate the attachment of screen tensioning means and to provide support for the edges of the screen cloth. To perform these functions requires a part of drastically reduced size and weight as compared to similarly located side plates of the conventionally designed machines. Similarly, it is clear that this machine lends itself readily to multiple deck operation in that the same cross members may be employed to support a second deck and this is without the necessity of providing additional sets of cross members for its support. This is a great advantage from a weight saving standpoint and also from the fact that where the deck is below the first deck as previously arranged, it will result in a minimum addition to the displacement of the center of mass of the vibrating screen body from the center of rotation of the revolving mass when this type of actuating unit is used, and thus will keep to a minimum any variation in the path of motion which is suffered by this displacement.

For all of the foregoing, it will be appreciated that a truly novel construction of vibrating screening apparatus is produced in efficient design employing the central longitudinal member and its associated vibrating structures in various forms together with cross members which are connected to the member by means of special wedge means and all of this structure incorporates a logical arrangement of components in a vibrating screening apparatus which is of greatly reduced simplicity.

This invention may be embodied in other specific forms without departing from the spirit of essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a screening apparatus at least one resiliently supported central longitudinal tubular member running parallel to the flow of material in the screening apparatus, said member being symmetrically located with respect to the screen structure and extending substantially the length of the screen deck, said longitudinal member being a central support for the entire screen assembly and being a hollow tubular member of rectangular cross section, and cross members connected to and running transversely of said longitudinal member in spaced relation in the direction of its length, said cross members being of rigid material and extending continuously under the screen decks supported thereby, and vibration producing elements secured to said central longitudinal member to produce the required vibrational motion in said member.

2. The screening apparatus of claim 1 in which the cross members attached to the central longitudinal member are tubular members attached thereto by means of wedge members comprising a split wedge member surrounding the tubular cross member and a housing member adapted for clamping to the longitudinal member whereby the split wedge member is drawn tightly around the tubular member to firmly clamp said member without injury to the surface or structure of the member whereby premature failure would be prevented.

3. The screening apparatus of claim 1 in which the vibration producing element is of an eccentrically weighted rotating type.

4. The screening apparatus of claim 1 in which the vibration producing element is of an eccentrically weighted type and located within the central longitudinal member whereby the distance between the center of rotation of the rotating element and the center of mass of the vibratory parts is minimized to maintain a substantially uniform circular motion on the vibratory body.

5. In a vibratory apparatus having vibration producing elements in engagement therewith and having an elongated cylindrical load supporting member, a supporting structure comprising at least one joint between a member having at least one wall with a circular aperture therethrough and said elongated cylindrical member of slightly smaller diameter than said circular aperture extending through said aperture in said wall, a ring having a continuous plane annular surface in face-to-face engagement with said wall having a central aperture of slightly larger diameter than said cylindrical member, said ring having a generally cylindrically shaped uniform force distributing inner surface defining said central aperture and an outer surface tapered to converge toward said cylindrically shaped inner surface on the side of said ring opposite said wall, an annular ring cap having an inner surface tapered to engage the outer surface of said ring, and an outwardly extending flange portion on the side of said ring cap facing said wall when said inner surface of said ring cap is in engagement with the outer surface of said ring, and threaded fastening means securing said flange against said wall.

(References on following page)

References Cited by the Examiner

UNITED STATES PATENTS

| | | | |
|---|---|---|---|
| 1,425,039 | 8/1922 | Najarian | 209—365 |
| 1,459,845 | 6/1923 | Mitchell | 209—326 |
| 1,524,341 | 1/1925 | Davis | 285—421 |
| 1,610,353 | 12/1926 | Bland | 209—367 |
| 1,744,899 | 1/1930 | Isbell | 209—367 |
| 1,983,676 | 12/1934 | Reynolds | 209—134 |
| 2,119,595 | 6/1938 | McNeely | 209—326 |
| 2,163,249 | 6/1939 | Sherman | 209—368 |
| 2,599,496 | 6/1952 | Soldan | 209—366.5 |
| 2,705,889 | 4/1955 | Mock | 73—71.5 |
| 2,709,521 | 5/1955 | Fisher | 209—365 |
| 2,749,157 | 6/1956 | Dennison | 287—52.08 |
| 2,819,099 | 1/1958 | Rittle | 285—159 |
| 2,925,911 | 2/1960 | Parks | 209—412 |
| 2,939,581 | 6/1960 | Ashton | 209—318 |
| 2,964,186 | 12/1960 | Ferrara | 209—326 |

FOREIGN PATENTS

| | | |
|---|---|---|
| 528,161 | 5/1954 | Belgium. |
| 64,834 | 7/1955 | France. |
| 1,048,912 | 8/1953 | France. |
| 1,099,517 | 3/1955 | France. |
| 121,358 | 12/1918 | Great Britain. |
| 122,785 | 2/1919 | Great Britain. |
| 743,817 | 9/1953 | Great Britain. |

HARRY B. THORNTON, *Primary Examiner.*

R. HALPER, *Assistant Examiner.*